Patented May 26, 1931

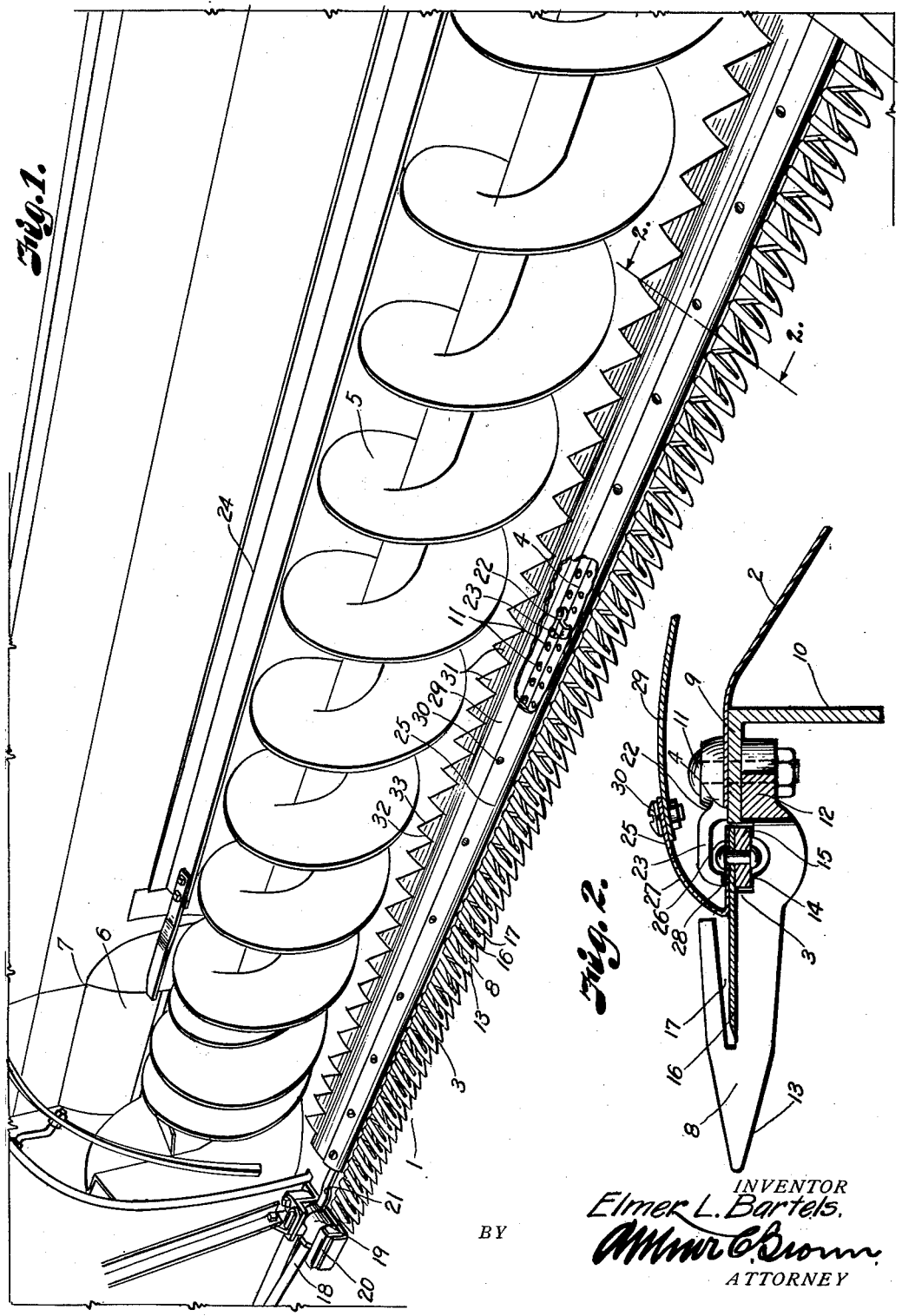

1,806,928

UNITED STATES PATENT OFFICE

ELMER L. BARTELS, OF INDEPENDENCE, MISSOURI, ASSIGNOR TO THE GLEANER COMBINE HARVESTER CORPORATION, OF INDEPENDENCE, MISSOURI, A CORPORATION OF DELAWARE

GRAIN CUTTING UNIT

Application filed January 20, 1930. Serial No. 421,828.

This invention relates to harvesting machines, and more particularly to the grain cutting unit of such machines as is illustrated in Letters Patent No. 1,702,323.

In harvesting machines of this character wherein a screw type conveyor is employed for delivering cut grain into the threshing cylinder, the grain under certain conditions bridges from the sickle bar over the conveyor screw so that when the grain is finally acted upon by the conveyor, it is discharged in bunches to the threshing cylinder.

It is the principal object of this invention to effect discharge of the cut grain from the sickle into the conveyor directly as it is cut by initially starting the grain in the same direction as the feed of the screw so that the grain is discharged into the threshing cylinder in a constant even stream at a substantially uniform rate.

In accomplishing this and other objects of the invention, I have provided improved details of structure, the preferred form of which is illustrated in the accompanying drawings, wherein:

Fig. 1 is a perspective view of the cutting unit of a combine harvester of the type illustrated in the above mentioned Letters Patent, including grain discharge and feeding mechanism constructed in accordance with my invention.

Fig. 2 is an enlarged detail sectional view through the sickle bar and the front edge of the grain pan on the line 2—2, Fig. 1.

Referring more in detail to the drawings.

1 designates the cutting unit of a harvesting machine including a grain pan 2 having a sickle 3 extending along its front edge 4, and rotatably mounted in the pan is a screw conveyor 5 for discharging grain cut by the sickle through an opening 6 located at the end of the pan, and into the threshing mechanism designated by the housing 7.

The sickle is of usual construction and comprises a sickle guard 8 which is attached to the horizontal flange 9 of a reinforcing angle 10 extending along the front edge 4 of the pan 2 by bolts 11 extending through the edge of the pan, through the flange of the angle 10 and through ears 12 on the rear edge of the guard as shown in Fig. 2.

The sickle guard includes the usual teeth 13 projecting forwardly of the pan and provided with rectangular shaped seats 14 in their upper faces adjacent the flange of the angle bar 10 for receiving a reciprocating sickle bar 15.

Riveted to the sickle bar as in ordinary practice are the sickle blades 16 which reciprocate through slots 17 formed in the sickle guard teeth 13 so that grain entering between the teeth is severed by the blades to fall into the grain pan. The sickle bar is reciprocated by a pitman 18 having a cross head 19 which is slidably mounted in a guide 20 attached to the angle 10 on the grain pan and the head is pivotally connected with the sickle bar by a strap 21 that is riveted to the end of the bar as in customary practice.

The sickle bar is retained in sliding relation with the sickle guard by clips 22 secured at intervals along the front edge of the pan by the bolts 11 and having forwardly projecting arms 23 extending over the top face of the sickle bar. The arms are also recessed on their under sides to pass the heads of the rivets upon reciprocation of the bar.

Mounted on the rear edge of the grain pan is an angle-shaped guard 24 extending longitudinally of the conveyor for preventing grain from being carried upwardly along the rear side of the conveyor by rotation of the screw.

The construction thus far described is substantially of the type illustrated in the above mentioned patent, and forms no part of the present invention except by association therewith for the purpose above mentioned and as now described.

Attached to the sickle bar and extending longitudinally thereof is a bracket plate 25 comprising a flat attaching portion 26 and an upwardly and rearwardly curved portion 27, the flat portion 26 being provided with openings 28 complementary to the rivet receiving opening in the sickle bar so that the bracket plate may be attached by the same rivets that secure the blades 16 to the sickle bar. The portion 26 of the bracket is also received under the arms of the sickle retaining clips and the curved portion curves freely over the clips so that the bracket will not interfere with the reciprocation of the sickle bar; the curved portion also serving as a guide to direct the grain onto a feeder, preferably comprising a sheet metal plate 29 attached to the under side of the curved portion of the bracket by bolts 30 extending through the plate and bracket as best shown in Fig. 2.

The free edge of the plate 29 inclines rearwardly towards the conveyor screw and is provided with projecting teeth 31 terminating slightly in advance of the screw as shown in Fig. 1.

The teeth 31 are preferably triangular in shape and include a substantially straight edge 32 extending laterally of the plate 29 and an inclined edge 33 inclined toward the feeding direction of the conveyor so that as the feeder is reciprocated in the feeding direction, the front straight edges of the teeth engage the grain to advance it in the direction of the conveyor feed and when the feeder is moved in the opposite direction, the inclined faces tend to push the grain towards the screw and not reversely to the advance of the screw.

Thus it is apparent that the feeder is reciprocated with the sickle bar and that cut grain falling thereon is prevented from bridging over the conveyor since the cut grain is advanced by the feeder in the direction that the screw is feeding so that the grain is fed uniformly into the conveyor as it is being cut to provide a constantly moving and uniform stream into the threshing mechanism of the machine.

What I claim and desire to secure by Letters Patent is:

1. In combination with a sickle and a screw conveyor associated therewith, a feeder positioned longitudinally of the screw for preventing material cut by the sickle from bridging across the screw conveyor.

2. In a cutting unit of a harvesting machine including a sickle and a conveyor, a feeder positioned between the sickle and the conveyor including a reciprocable plate having teeth extending in the plane thereof and toward the conveyor for discharging cut material from the sickle into the conveyor, and means for operating the feeder.

3. In a cutting unit of a harvesting machine including a reciprocating sickle and a conveyor, a feeder positioned between the sickle and the conveyor having teeth projecting toward the conveyor for discharging cut material from the sickle into the conveyor, and means for operating the feeder.

4. In a harvesting machine including a sickle and a conveyor, a feeder comprising a plate mounted on the sickle having teeth for directing material cut by the sickle into the conveyor.

5. In a harvesting machine, a sickle, means for reciprocating the sickle, a conveyor for moving material cut by the sickle, and a feeder reciprocable with the sickle including a curved plate having teeth extending toward the conveyor for feeding cut material into the conveyor.

6. In a harvesting machine, a sickle, means for reciprocating the sickle, a conveyor for moving material cut by the sickle, a bracket supported by the sickle, a feeder plate carried by the bracket and having teeth for feeding the cut material into the conveyor.

7. In a harvesting machine, a sickle, means for reciprocating the sickle, a conveyor for moving material cut by the sickle, a bracket supported by the sickle, a feeder plate carried by the bracket and having triangular-shaped teeth for feeding cut material into the conveyor.

8. In a harvesting machine, a sickle, means for actuating the sickle, a conveyor associated with the sickle for moving material cut by the sickle, a feeder carried by the sickle for feeding cut material into the conveyor, and a guard for retaining the cut material in conveying position with relation to the conveyor.

9. In a harvesting machine, a sickle, means for reciprocating the sickle, a conveyor for moving material cut by the sickle, a bracket member fixed to the sickle, clips bearing on the bracket member to retain the sickle, feeding means carried by the bracket member and projecting toward the conveyor for preventing grain from bridging across the conveyor.

10. In combination with a sickle and a conveyor screw associated therewith for moving grain cut by the sickle, a feeder positioned between the sickle and the conveyor having a series of teeth projecting laterally toward the conveyor screw for preventing the grain from bridging across the conveyor screw and means for actuating the feeder.

In testimony whereof I affix my signature.

ELMER L. BARTELS.